US005804242A

United States Patent [19]
Wallin

[11] Patent Number: 5,804,242
[45] Date of Patent: *Sep. 8, 1998

[54] SUGARLESS BAKERY GOODS, E.G., CAKES

[75] Inventor: Glenn Wallin, Seattle, Wash.

[73] Assignee: Bunge Foods Corporation, Seattle, Wash.

[*] Notice: The term of this patent shall not extend beyond the expiration date of Pat. No. 5,523,107.

[21] Appl. No.: 965,075

[22] Filed: Nov. 5, 1997

Related U.S. Application Data

[63] Continuation of Ser. No. 609,459, Mar. 1, 1996, Pat. No. 5,700,511, which is a continuation of Ser. No. 277,323, Jul. 19, 1994, Pat. No. 5,523,107.

[51] Int. Cl.$^6$ .................................................. A21D 10/00
[52] U.S. Cl. ...................... 426/549; 426/552; 426/554; 426/567; 426/661; 426/804
[58] Field of Search ..................... 426/549, 552, 426/554, 567, 804, 808, 661

[56] References Cited

U.S. PATENT DOCUMENTS

| | | | |
|---|---|---|---|
| 3,505,110 | 4/1970 | Kesler et al. | 127/29 |
| 4,323,588 | 4/1982 | Vink et al. | 426/564 |
| 4,377,602 | 3/1983 | Conrad | 426/656 |
| 4,622,233 | 11/1986 | Torres | 426/548 |
| 4,623,549 | 11/1986 | Katt et al. | 426/548 |
| 4,780,149 | 10/1988 | Kaper et al. | 127/38 |
| 4,816,282 | 3/1989 | Kramer et al. | 426/549 |
| 4,857,354 | 8/1989 | Ishida et al. | 426/558 |
| 4,885,379 | 12/1989 | Abend | 558/34 |
| 4,963,359 | 10/1990 | Haslwanter et al. | 424/440 |
| 4,981,709 | 1/1991 | Furcsik et al. | 426/565 |
| 5,030,460 | 7/1991 | Baggerly | 426/103 |
| 5,094,872 | 3/1992 | Furcsik et al. | 426/578 |
| 5,110,612 | 5/1992 | Quarles et al. | 426/548 |
| 5,376,399 | 12/1994 | Dreese et al. | 426/658 |
| 5,523,107 | 6/1996 | Wallin | 426/549 |
| 5,700,511 | 12/1997 | Wallin | 426/549 |

FOREIGN PATENT DOCUMENTS

| | | |
|---|---|---|
| 0 191 250 A2 | 8/1986 | European Pat. Off. . |
| 0 399 995 A1 | 11/1990 | European Pat. Off. . |
| 1 517 158 | 7/1978 | United Kingdom . |

OTHER PUBLICATIONS

Daniel G. Murray, "New Starch Hydrolysates Improved Product Formulation", Food Engineering, Jun. 1969.
Frye, et al., "Optimizing Texture of Reduced–Calorie Yellow Layer Cakes", ©1991 Cereal Chemistry 69(3):338–343.
Product Information, Hystar® 5857, Lonza, Inc. Feb. 1986.
Manufacturer's Product Specification for Lycasin® Nov. 1993.
Manufacturer's Product Specifications for Maltisorb® Crystalline Jan. 1994.
Manufacturer's Product Specifications for Maltisorb P 200—Maltitol Apr. 1994.

*Primary Examiner*—Lien Tran
*Attorney, Agent, or Firm*—Marshall, O'Toole, Gerstein, Murray & Borun

[57] ABSTRACT

Essentially sugar-free bakery goods, such as cakes, donuts, muffins and the like, that are formed from a batter mixture that includes (in the pre-baked form) about 15% to about 25% by weight (solids basis) of starch hydrolysate comprising polyhydroxy oligomers, predominantly having a degree of polymerization (DP) of 1–3, e.g., HYSTAR® 5875 from Lonza Inc. of Fair Lawn, N.J.; about 10% to about 25% water; about 10% to about 20% oil or fat; and about 0.01% to about 1% by weight of a high potency, sugar-free sweetening agent, such as aspartame. Other typical ingredients used in forming a dough for baking also are included, such as a protein source, e.g., flour, wheat gluten and/or modified corn starch, in combined amounts of about 15% to about 25%; one or more leavening agents, such as sodium bicarbonate (baking soda) and sodium aluminum phosphate; and one or more emulsifiers to aid in forming a homogeneous dough mixture, to tenderize the baked product and aid in aerating the dough during mixing and homogenization.

26 Claims, No Drawings

SUGARLESS BAKERY GOODS, E.G., CAKES

CROSS-REFERENCE TO RELATED APPLICATION

This is a continuation of U.S. application Ser. No. 08/609,459 filed Mar. 1, 1996, now U.S. Pat. No. 5,700,511 which is a continuation of U.S. application Ser. No. 08/277,323, filed Jul. 19, 1994, now U.S. Pat. No. 5,523,107.

FIELD OF THE INVENTION

The present invention is directed to essentially sugar-free bakery goods, such as cakes, donuts, muffins, and the like. More particularly, the present invention is directed to sugar-free bakery goods that, instead of sugar, are formulated with an increased level of flour; a starch hydrolysate, prepared by hydrolysis of, e.g., corn syrup to form a mixture of oligomeric polyols predominantly having a degree of polymerization of 2; and a high potency sweetening agent, such as aspartame. The essentially sugar-free (<1%, preferably <0.5% by weight reducing sugar content) bakery goods maintain the appearance, texture, structure, mouth feel, and other sensory parameters of high-calorie, sugar-containing bakery goods and are particularly desirable for diabetics, dieters and the like.

BACKGROUND OF THE INVENTION AND PRIOR ART

Diabetics and nutrition-conscious consumers have fueled the need and desire for sugar-free bakery goods, but the replacement of sugar with sugar-free substitutes and sugar derivatives, such as hydrolyzed starch carbohydrates, in baked goods has been a very formidable task. As pointed out in Frye, et al., *Optimizing Texture of Reduced-Calorie Yellow Layer Cakes*, Cereal Chemistry, 69(3) pages 338–343, the role of sucrose in cake formulations goes far beyond providing sweetness. Sucrose also retards and restricts gluten formation; increases the temperature of egg protein denaturation and starch gelatinization, contributes to bulk, volume and flavor retention; adds structural integrity; and provides sensory properties, e.g., mouth feel, that have been impossible to replace except by substitution with fruit juices, or other sugar-containing or sugar derivatives-containing materials that include, for example, fructose, dextrose, and the like.

Others have incorporated high potency sugar substitutes, such as aspartame, into frosted coatings, for use on cereal flakes, toaster pastries, confections and sweetened snack foods (see U.S. Pat. No. 5,030,460). Also, others have included starch hydrolysates as glazings and icings for donuts and cakes, see Murray, *NEW STARCH HYDROLYSATES IMPROVE PRODUCT FORMULATION*, FOOD ENGINEERING, June 1969, pages 87–90. Further, others have used starch hydrolysates or maltodextrins as bulking agents in cake or batter formulations and/or as a total or partial replacement for sucrose, fat and/or oil (see U.S. Pat. No. 5,094,872; published European Patent Application 0 191 250 A2; British Patent No. 1,517,158; U.S. Pat. Nos. 4,377,062; 4,780,149; and 4,816,282).

Further, others have proposed, for use in baked goods, a combination of hydroxypropylated starch and a high potency sweetener, such as aspartame, in an attempt to achieve the bulking properties of sugar, as disclosed in U.S. Pat. Nos. 5,110,612 and 4,623,549. Other bulking agents for replacement of sucrose include polydextrose, as disclosed in U.S. Pat. No. 4,622,233. Polydextrose, however, has been found to leave a bitter aftertaste in baked goods. HYSTAR® 5875 and/or LYCASIN® and/or MALTISORB® P200 (Crystalline Maltitol) are the preferred oligomeric polyol blends used to replace sugar in the baked goods of the present invention. Product information indicates that the material is suitable for foods and many other uses. U.S. Pat. No. 4,885,379 discloses incorporating HYSTAR® 5875 in a shampoo formulation.

SUMMARY OF THE INVENTION

In brief, the present invention is directed to essentially sugar-free bakery goods, such as cakes, donuts, muffins and the like, that are formed from a batter mixture that includes (in the pre-baked form) about 15% to about 25% by weight (solids basis) of starch hydrolysate comprising polyhydroxy oligomers, predominantly having a degree of polymerization (DP) of 1–3, e.g., HYSTAR® 5875 from Lonza Inc. of Fair Lawn, N.J.; about 10% to about 25% water; about 10% to about 20% oil or fat; and about 0.01% to about 1% by weight of a high potency, sugar-free sweetening agent, such as aspartame.

Other typical ingredients used in forming a batter for baking also are included, such as a protein source, e.g., flour, wheat gluten and/or food starch, in combined amounts of about 15% to about 25% to provide structure and cohesiveness to a batter that holds in gases for leavening the batter during baking; one or more leavening agents, such as sodium bicarbonate (baking soda) and sodium aluminum phosphate, capable of reaction to form a gas, e.g., $CO_2$, during baking, in usual amounts, e.g., less than about 1% by weight; one or more emulsifiers to aid in forming a homogeneous batter mixture, to tenderize the baked product and aid in aerating the dough during mixing and homogenization; optionally one or more additional bulking agents or fillers, in addition to the hydrogenated starch oligomeric polyols, such as food starch, in an amount of about 1% to about 5% by weight, that also serves to absorb water, reduce the cost of the mix, and add viscosity to the batter mix. Whole egg, oil, and water can be omitted from the mix for addition by the consumer to maintain the batter mix in dry form for convenience in shipping and handling; and optional sugar-free flavoring constituents, such as salt, vanillin, chocolate, and the like, can be included in the mix or added by the consumer to provide a desired taste.

Surprisingly, the batter mixture, when baked, provides sugar-free bakery goods that are essentially indistinguishable from a sugar-containing recipe in taste, mouth feel, texture, structure, tenderness, and other properties and does not have a bitter after taste.

Accordingly, one aspect of the present invention is to provide a new and improved bakery batter suitable for baking cakes, muffins, and like baked goods, that is essentially sugar-free and is essentially indistinguishable from sugar-containing baked goods.

Another aspect of the present invention is to provide a new and improved essentially sugar-free baking batter that includes an essentially sugar-free starch hydrolysate comprising oligomeric polyols having a degree of polymerization (DP) primarily in the range of 1 to 3, predominantly DP-2; and a sugar-free, high potency sweetening agent, such as aspartame. In combination, the oligomeric polyol(s) and high potency sweetening agent completely replace the sugar of prior art batter recipes. Preferably, the protein content, e.g., flour and/or gluten, and water content are increased, in the final batter formulation, in comparison to sugar-containing recipes, by about 5% to about 10% by weight.

The above and other aspects of the present invention will become more apparent from the following detailed description of the preferred embodiments and examples.

DETAILED DESCRIPTION OF THE PREFERRED EMBODIMENTS

As indicated in the prior art, e.g., U.S. Pat. No. 5,110,612, materials such as cellulose derivatives and particular starch hydrolysates have met with limited success in replacing sucrose because of the high viscosities associated with these sucrose replacements. The high viscosity sucrose replacements have adversely modified the textural properties of the food products in which they are incorporated. Applicants, on the other hand, have found a baked dessert formulation that includes one or more oligomeric polyols, predominantly a dimer having the structural formula I, as follows:

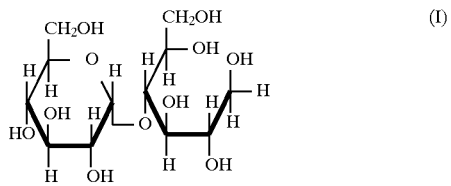

Although the commercial oligomeric polyol blend (HYSTAR® 5875) has about 4 calories per gram of solids and, therefore, does not by itself significantly reduce the calorie content of the baked dessert product in which it is incorporated, when combined with a high potency sweetener, the formulations of the present invention provide baked dessert products essentially free from simple sugars. Accordingly, the baked desserts of the present invention can be ingested by diabetics, and the sucrose replacement combination of the oligomeric polyols and a high potency sweetener provides sufficient bulk, volume, structural integrity, sensory properties, e.g., mouth feel and flavor retention, to provide a baked dessert product which is virtually indistinguishable from a simple sugar-containing, e.g., sucrose-containing, baked dessert. Essentially, the only distinguishing feature between the baked products of the present invention and similar baked desserts that incorporate simple sugars, such as sucrose, is that the essentially sugar-free product does not provide complete visual browning that occurs when the formulations contain simple sugars.

Suitable high potency sweeteners useful in the formulations of the present invention are apparent to those of ordinary skill in the art. Preferred sweeteners include dipeptide sweeteners, such as aspartame, alitam, proteinaceous sweeteners, such as monellin and thaumatin, and other sweeteners, such as acesulfame X, sodium saccharine, cyclamates sucralose, and the like.

A final dessert batter formulation, including liquid components, in accordance with the present invention includes the following components (a)–(h) as follows:

(a) an oligomeric polyol bulking and sweetening agent having the following structural formula (I):

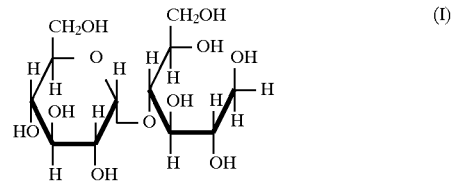

in an amount of about 20% to about 30% by weight of the formulation;

(b) an edible oil or fat in an amount of about 10% to about 20% by weight of the formulation;

(c) a protein source selected from flour, gluten, starch and mixtures thereof in an amount of about 15% to about 30% by weight of the formulation;

(d) one or more whole eggs in an amount of about 10% to about 25% by weight of the formulation;

(e) a leavening agent in an amount of about 0.1% to about 2% by weight of the formulation;

(f) a high potency, sugarless sweetening agent in an amount of about 0.1% to about 1% by weight of the formulation;

(g) a flavoring agent in an amount of about 0.1% to about 5% by weight of the formulation; and (h) water in an amount of about 8% to about 20% by weight of the formulation.

Preferably, the dessert formulation dough, having the components listed above, further includes one or more emulsifiers, in an amount of about 0.01% to about 2% by weight of the formulation to form a homogeneous batter mixture and to tenderize the baked product and aid in aerating the batter during mixing and homogenization. The preferred source for the oligomeric polyol of structural formula (I) is Lonza, Inc.'s polyol blend sold under the trademark HYSTAR® 5875, or Roquette Corporation's LYCASIN®, containing a predominance (at least 50%) of the polyol dimer having the structural formula I and, in accordance with the present invention, the polyol(s) incorporated into the batter formulation have a polyol distribution shown in Table 1:

TABLE 1

| Polyol Distribution | | HYSTAR ® 5875 Wt. % | Wt. % of blend for incorporation into dessert batter formulation |
|---|---|---|---|
| DP-1 | CH₂OH structure (II) | 7 | 0–15 |

TABLE 1-continued

| Polyol Distribution | | HYSTAR ® 5875 Wt. % | Wt. % of blend for incorporation into dessert batter formulation |
|---|---|---|---|
| DP-2 | (structure I) | 60 | 35–100 |
| DP-3 | (structure III) | 11 | 0–20 |
| DP-4+:(n = 2+) | (structure IV) | 22 | 0–30 |

This product is obtained by hydrolyzing corn syrup to provide the polyol distribution shown in Table 1 and includes less than 0.2% reducing sugar in the product (100% solids basis). The product can be used in a 100% solids form Crystalline MALTISORB® from Roquette Corporation, having about 4 calories per gram of solids, or is more conveniently used as obtained from the manufacturer as a viscous liquid containing about 75% dissolved solids and 25% by weight water.

The preferred final dough formulation is shown in Example 1:

SUGARLESS CAKE BATTER

| Ingredient | Preferred Percentage of Formulation | Ranges |
|---|---|---|
| Hydrolysate (oligomeric polyol) (100% solids basis) | 19.87 | 10–30 |
| Flour | 22.17 | 15–30, pref. 17–25 |
| Whole Egg | 18.56 | 10–25 |
| Oil | 14.94 | 10–20 |
| Water | 18.52 | 10–30 |
| Modified Food Starch | 2.36 | 0–5 |
| Salt | 0.82 | 0–2 |
| Emulsifiers | 0.76 | 0.1–2 |
| Vital Wheat Gluten | 0.80 | 0–2 |
| Sodium Aluminum Phosphate | 0.42 | 0.1–1 |
| Baking Soda | 0.42 | 0.1–1 |

SUGARLESS CAKE BATTER

| Ingredient | Preferred Percentage of Formulation | Ranges |
|---|---|---|
| High Potency Sweetener, e.g., Aspartame | 0.30 | 0.1–1, pref. 0.1–0.4 |
| Flavor | 0.06 | 0–2 |
| TOTALS: | 100% | |

As is common in the cake mix art, it is most convenient for packaging, storage, maintenance of freshness and longevity to prepare a cake mix using only the dry ingredients and allowing the consumer to add any egg components or whole eggs, water, oil and the like at the time of preparing the cake. For these reasons it is preferred to package a dry mix formulation, including the polyols as 100% solids, or separately as a liquid oligomeric polyol additive, and to allow the consumer to add whole egg, vegetable oil and water, in final mixing stages to prepare the final batter formulation shown above.

The preferred dry mix formulation and a description of first and second mixing stages for mixing the dry mix formulation with the oligomeric polyol, whole egg, salad oil and water are shown in Example 2:

SUGARLESS CAKE FORMULATION
DRY MIX FORMULATION

| Ingredient | Preferred Percentage of Formulation | Ranges | Preferred Ranges |
|---|---|---|---|
| Flour | 74.86 | 65–85 | 70–80 |
| Vital Wheat Gluten | 2.7 | 0–5 | 1–4 |
| Sodium Aluminum Phosphate | 1.41 | 0–5 | 0.5–2 |
| Salt | 2.77 | 0–5 | 1–4 |
| BakingSoda | 1.41 | 0.1–3 | 0.5–2 |
| Salad Oil | 5.10 | 1–10 | 2–7 |
| Emulsifiers (e.g., Propylene Glycol Monoesters, Mono- and Diglycerides, Sodium Stearoyl Lactylate) | 2.57 | 0.1–10 | 1–5 |
| Modified Food Starch | 7.98 | 0–20 | 5–15 |
| Nutrasweet Aspartame | 1.00 | 0.2–3 | 0.5–2 |
| Flavor | 0.2 | 0–5 | 0.5–2 |
| TOTALS: | 100% | | |

FINAL BATTER FORMULATION FROM DRY MIX OF EXAMPLE 2:

| 1st Stage: | Mix dry batter formulation of Example 2 with liguid oligomeric polyol blend and whole eggs, as follows: | |
|---|---|---|
| | | wt. % |
| | Example 2 mix | 29.62 |
| | Hydrolysate (HYSTAR ® 5875) | 26.42 (75% solids) |
| | Whole Egg | 18.56 |
| 2nd Stage: | Mix the product of the 1st Stage with water and vegetable (salad) oil, as follows: | |
| | Salad Oil | 13.43 |
| | Water | 11.97 |
| | TOTALS: | 100% |

Alternatively, the oligomeric polyol(s) can be included in the dry formulation as 100% solids, in a dry mixture. Either a portion of the salad oil can be included in the dry mix, as in Example 2, or the salad oil can be completely omitted in a completely dry formulation having the following components in the amounts shown in Example 3.

SUGARLESS CAKE FORMULATION
ALTERNATIVE DRY MIX FORMULATION

| Ingredient | Preferred Percentage of Formulation | Ranges | Preferred Ranges |
|---|---|---|---|
| Hydrolysate solids (oligomeric polyol) | 41.5 | 30–50 | 35–45 |
| Flour | 46.3 | 35–55 | 40–50 |
| Wheat Gluten | 1.4 | 0–5 | 1–3 |
| Sodium Aluminum Phosphate | 0.9 | 0–5 | 0.5–2 |
| Salt | 1.7 | 0–5 | 1–3 |
| Baking Soda | 0.6 | 0.1–5 | 0.2–2 |
| Emulsifiers | 1.6 | 0.1–5 | 1–3 |
| Food Starch | 4.9 | 0–10 | 2–10 |
| Aspartame | 0.6 | 0.1–3 | 0.2–1.0 |
| Flavor | 0.5 | 0–5 | 0.1–2 |
| TOTALS: | 100% | | |

FINAL BATTER FORMULATION FROM DRY MIX OF EXAMPLE 3

| 1st Stage: | Mix dry batter formulation of Example 3 with whole eggs, as follows: | |
|---|---|---|
| | | wt. % |
| | Example 3 mix | 47.90 |
| | Whole Egg | 18.56 |
| 2nd Stage: | Mix the product of the 1st Stage with water and vegetable (salad) oil, as follows: | |
| | Salad Oil | 15.02 |
| | Water | 18.52 |
| | TOTALS: | 100% |

Any commercially available powdered or liquid flavoring may also be added to provide any desired flavor to the baked dessert formulation and to adjust texture, where desired. Flavorings include liquid vanillin flavor, chocolate powder, chopped nuts, artificial fruit flavors, nut extracts, e.g., almond extract, salt, unsweetened chocolate, and the like.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the formulations may be varied without departing from the spirit of the invention, and the exclusive use of all modifications which come within the scope of the appended claims is reserved.

What is claimed is:

1. An essentially sugar-free cake or muffin batter formulation containing sufficient flour water and egg such that, upon heating to an appropriate baking temperature the batter formulation will increase in volume to form a baked cake or muffin comprising:

(a) an oligomeric polyol bulking and sweetening agent predominantly having the following structural formula (I):

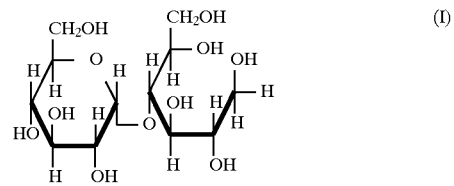

in an amount of about 10% to about 30% by weight of the batter formulation;

(b) a leavening agent in an amount of about 0.1% to about 2% by weight of the formulation;

(c) a high potency, sugarless sweetening agent in an amount of about 0.1% to about 1% by weight of the formulation; and (d) a flavoring agent in an amount of about 0.1% to about 5% by weight of the formulation.

2. The cake or muffin batter formulation of claim 1, wherein the batter formulation comprises a blend of polyols including about 5% to about 35%, based on the total dry weight of polyols in the batter formulation, of polyols having the structural formulae II and III:

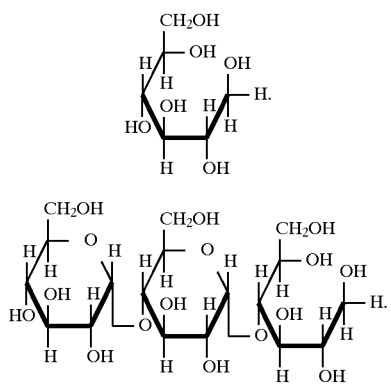

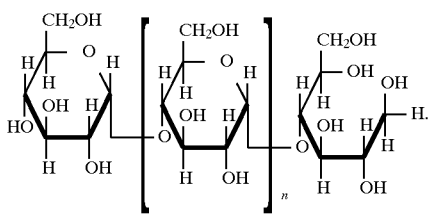

3. The cake or muffin batter formulation of claim 2, wherein the oligomeric blend comprises about 50% to about 70% by weight of the oligomeric polyol of formula I; about 2% to about 15% by weight of the polyol of formula II; and about 5% to about 20% by weight of the polyol of formula III, based on the dry weight of polyols in the formulation.

4. The cake or muffin batter formulation of claim 3, wherein the polyol blend further includes about 10% to about 30% by weight of oligomeric polyols having the structural formula IV, based on the dry weight of polyols in the formulation, wherein n is an integer of at least 2:

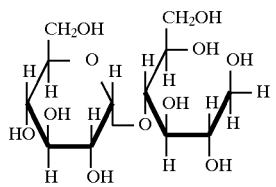

5. The cake or muffin batter formulation of claim 4, wherein the polyols of formula IV comprise a blend of polyols selected from the group consisting of n=2, n=3, n=4, n=5, n=6, n=7, n=8, and mixtures thereof.

6. The cake or muffin batter formulation of claim 1, wherein the high potency sweetener is aspartame.

7. An essentially dry, sugar-free cake or muffin mixture capable of admixture with water, to provide a cake batter suitable for baking into a cake or muffin that is essentially indistinguishable from a sugar-containing cake or muffin comprising:

(a) an oligomeric polyol bulking and sweetening agent predominantly having the following structural formula (I):

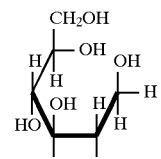

in an amount of about 30% to about 50% by weight of the dry mixture;

(b) a protein source selected from the group consisting of flour, gluten, starch and mixtures thereof in an amount sufficient such that upon heating to an appropriate baking temperature, the batter will increase in volume to form a baked cake or muffin;

(c) a leavening agent in an amount of about 0.1% to about 5% by weight of the dry mixture;

(d) a high potency, sugarless sweetening agent in an amount of about 0.1% to about 3% by weight of the dry mixture.

8. The dry cake or muffin mixture of claim 7, further including a dry emulsifier in an amount of about 0.1% to about 5% by weight of the dry mixture.

9. The dry cake or muffin mixture of claim 7, wherein the oligomeric polyol comprises a blend of polyols including about 5% to about 35%, total percentage of both polyols, based on the total dry weight of polyols in the batter formulation, having the structural formulae II and III:

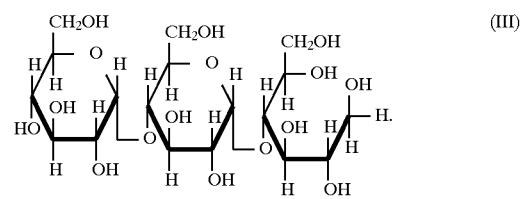

10. The dry cake or muffin mixture of claim 9, wherein the oligomeric blend comprises about 50% to about 70% by weight of the oligomeric polyol of formula I; about 2% to about 15% by weight of the polyol of formula II; and about 5% to about 20% by weight of the polyol of formula III, based on the dry weight of polyols in the cake or muffin mixture.

11. The dry cake or muffin mixture of claim 10, wherein the polyol blend further includes about 10% to about 30% by weight of oligomeric polyols having the structural formula IV, wherein n is an integer of at least 2:

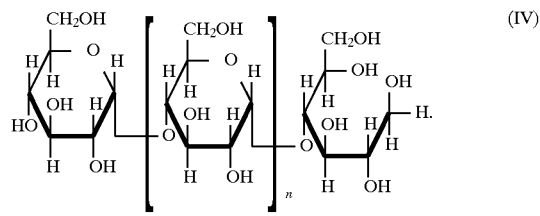

12. The dry cake or muffin mixture of claim 11, wherein the polyols of formula IV comprise a blend of polyols selected from the group consisting of n=2, n=3, n=4, n=5, n=6, n=7, n=8, and mixtures thereof.

13. The dry cake or muffin mixture of claim 7, wherein the high potency sweetener is aspartame.

14. The dry cake or muffing mixture of claim 7, further including an oil in an amount of about 0.1% to about 3% of the dry mixture.

15. The dry cake or muffin mixture of claim 7, having the following formulation:

| Ingredient | Range wt. % |
| --- | --- |
| Oligomeric Polyol | 30–50 |
| Flour | 35–55 |
| Wheat Gluten | 0–5 |
| Leavening Agent | 0–5 |
| Salt | 0–5 |

-continued

| Ingredient | Range wt. % |
|---|---|
| Baking Soda | 0.1–3 |
| Oil | 0–10 |
| Emulsifier | 0.1–5 |
| Food Starch | 0–10 |
| Aspartame | 0.1–3 |
| Flavor | 0–5 |

16. The dry cake or muffin mixture of claim 15, having the following formulation:

| Ingredient | Range wt. % |
|---|---|
| Oligomeric Polyol | 35–45 |
| Flour | 40–50 |
| Wheat Gluten | 1–3 |
| Leavening Agent | 0.5–2 |
| Salt | 1–3 |
| Baking Soda | 0.2–2 |
| Salad Oil | 0–7 |
| Emulsifier selected from the group consisting of Propylene Glycol Monoesters, Mono- and Diglycerides, Sodium Stearoyl Lactylate, and mixtures | 1–3 |
| Food Starch | 2–10 |
| Nutrasweet Aspartame | 0.2–1 |
| Flavor | 0.1–2 |

17. A method of manufacturing a cake or muffin dough from the dry mixture of claim 7 comprising adding water to said dry mixture in an amount of at least about 10% by weight, based on the total weight of the batter.

18. The method as recited in claim 17 further including the step of baking said dough until the dough rises into an edible cake or muffin.

19. An essentially sugar-free cake or muffin batter formulation which, upon heating to an appropriate baking temperature will increase in volume to form a baked cake or muffin comprising:

(a) an oligomeric polyol bulking and sweetening agent including a polyol having the following structural formula (I):

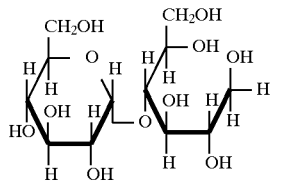

said polyol of formula I included in the batter in an amount of about 10% to about 18% by weight of the batter formulation;

(b) a protein source selected from the group consisting of flour, gluten, starch and mixtures thereof in an amount sufficient such that, upon heating to an appropriate baking temperature, the batter will increase in volume to form a baked cake or muffin;

(c) a leavening agent in an amount of about 0.1% to about 2% by weight of the formulation;

(d) a high potency, sugarless sweetening agent in an amount of about 0.1 to about 1% by weight of the formulation;

(e) a flavoring agent in an amount of about 0.1% to about 5% by weight of the formulation; and (f) water in an amount of at least about 8% by weight of the formulation.

20. The cake or muffin batter of claim 19, wherein the protein source is included in the formulation in an amount of about 15% to about 37% by weight.

21. The cake or muffin batter of claim 20, wherein water is included in the formulation in an amount of about 8% to about 30% by weight of the formulation.

22. The dry cake or muffin mixture of claim 7, wherein the protein source is included in the mixture in an amount of about 35% to about 70% by weight.

23. An essentially sugar-free cake or muffin batter formulation containing sufficient flour, water, leavening agent and egg such that, upon heating to an appropriate baking temperature the batter formulation will increase in volume to form a baked cake or muffin comprising:

(a) an oligomeric polyol bulking and sweetening agent predominantly having the following structural formula (I):

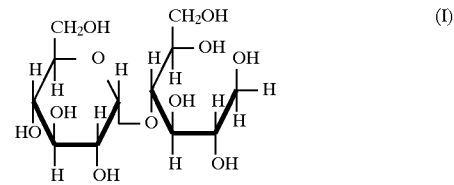

in an amount of about 10% to about 30% by weight of the batter formulation;

(b) a protein source selected from the group consisting of flour, gluten, starch and mixtures thereof in an amount sufficient such that, upon heating to an appropriate baking temperature, the batter will increase in volume to form a baked cake or muffin;

(c) a high potency, sugarless sweetening agent in an amount of about 0.1% to about 1% by weight of the formulation;

(d) a flavoring agent in an amount of about 0.1% to about 5% by weight of the formulation; and (e) water in an amount of at least about 8% by weight of the formulation.

24. The batter formulation of claim 23, wherein the protein source is included in the formulation in an amount of about 15% to about 37% by weight; the leavening agent is included in the formulation in an amount of about 0.1% to about 2% by weight; and water is included in the formulation in an amount of about 8% to about 30% by weight of the formulation.

25. An essentially dry, sugar-free cake or muffin mixture capable of admixture with water, to provide a cake batter suitable for baking into a cake or muffin that is essentially indistinguishable from a sugar-containing cake or muffin comprising:

(a) an oligomeric polyol bulking and sweetening agent having the following structural formula (I):

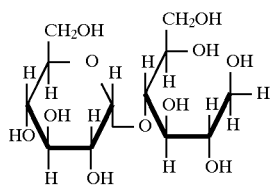 (I)

in an amount of about 18% to about 30% by weight of the dry mixture;

(b) a protein source selected from the group consisting of flour, gluten, starch and mixtures thereof in an amount sufficient such that, upon heating to an appropriate baking temperature, the batter will increase in volume to form a baked cake or muffin;

(c) a leavening agent in an amount of about 0.1% to about 5% by weight of the dry mixture;

(d) a high potency, sugarless sweetening agent in an amount of about 0.1% to about 3% by weight of the dry mixture.

26. The cake or muffin mixture of claim 25, wherein the protein source is included in the mixture in an amount of about 35% to about 70% by weight.

* * * * *

UNITED STATES PATENT AND TRADEMARK OFFICE
CERTIFICATE OF CORRECTION

PATENT NO. : 5,804,242
DATED : September 8, 1998
INVENTOR(S) : Glenn Wallin

It is certified that error appears in the above-identified patent and that said Letters Patent is hereby corrected as shown below:

Column 4,
Line 1, after "sweeteners, such as," please delete "acesulfame X" and insert
-- acesulfame K -- in its place.

Column 12,
Line 2, after "amount of about,," please delete "0.1" and insert -- 0.1% -- in its place.

Signed and Sealed this

Fourteenth Day of October, 2003

JAMES E. ROGAN
*Director of the United States Patent and Trademark Office*